June 4, 1968  J. C. DAVIDSON  3,386,536

BRAKE CONTROL MECHANISM

Filed Dec. 5, 1966

INVENTOR
JAMES C. DAVIDSON

ATTORNEY

United States Patent Office 3,386,536
Patented June 4, 1968

3,386,536
BRAKE CONTROL MECHANISM
James C. Davidson, Sherbrooke, Quebec, Canada, assignor to Canadian Ingersoll-Rand Company Limited, Montreal, Quebec, Canada, a corporation of Canada
Filed Dec. 5, 1966, Ser. No. 599,034
10 Claims. (Cl. 188—174)

This invention relates to brake apparatus and has more particular reference to the provision of a new and improved mechanism for controlling the operation of fluid pressure operated brake apparatus such as is employed, for example, on mine hoists and the like.

Conventionally, fluid pressure operated brake apparatus of the type employed on mine hoists and the like is usually controlled by a fluid operated motor, commonly called a service cylinder, which is connected to the brake apparatus by linkage suitable to cause its operation to selectively apply and release the brake apparatus. In addition, mining regulations generally require that the service cylinder be supplemented by a secondary or emergency control apparatus which is capable of automatically applying the brake apparatus in the event of an emergency. This secondary control apparatus is usually supplied in the form of a deadweight which is vertically supported by fluid from the source supplying the service cylinder and connected to the aforesaid linkage by additional linkage suitable to cause the brake apparatus to be applied in the event that a malfunction occurs in the fluid system. Thus, in brief, conventional mechanisms for controlling a fluid pressure operated brake apparatus of this type usually comprise a service cylinder and a deadweight, connected to the brake apparatus in parallel with the service cylinder, for automatically applying the brake apparatus in the event of an emergency.

The aforedescribed connection of the deadweight to the brake apparatus by linkage additional to that connecting the service cylinder to the brake apparatus is, however, undesirable. More specifically, this additional linkage requires precise manufacture and extensive hand fitting and, hence, is extremely expensive in manufacture and assembly. In addition, during the operation of the secondary control apparatus, this additional linkage provides an undesirable source of friction. Moreover, the aforesaid construction of the deadweight and the service cylinder provides a control mechanism which, in application, requires an undesirably large area.

The principal object of the present invention is to provide a new and improved mechanism for controlling the operation of fluid pressure operated brake apparatus such as is employed, for example, on mine hoists and the like, which mechanism is relatively compact and economical in construction and highly dependable and efficient in operation.

The aforegoing object, and those other objects and advantages of the invention which will be apparent from the following description taken in connection with the accompanying drawings, are attained by the provision of a new and improved brake control mechanism comprising cylinder means, a first piston disposed within the cylinder means for vertical movement therein, and a second piston disposed within the cylinder means for vertical movement therein and vertically aligned with the first piston. A means is provided for connecting the first piston to a brake apparatus such that vertical movement of the first piston controls the operation of such brake apparatus. A means is provided for supplying to the cylinder means pressurized fluid for causing vertical movement of the first piston; and a means is provided for supplying to the cylinder means pressurized fluid for vertically supporting the second piston. A means is provided for biasing the second piston towards the pressurized fluid supplied by the latter pressurized fluid supplying means; and the pistons are relatively arranged such that vertical movement of the second piston by the biasing means causes conjoined vertical movement of the pistons.

Referring to the drawings.

Figure 1:
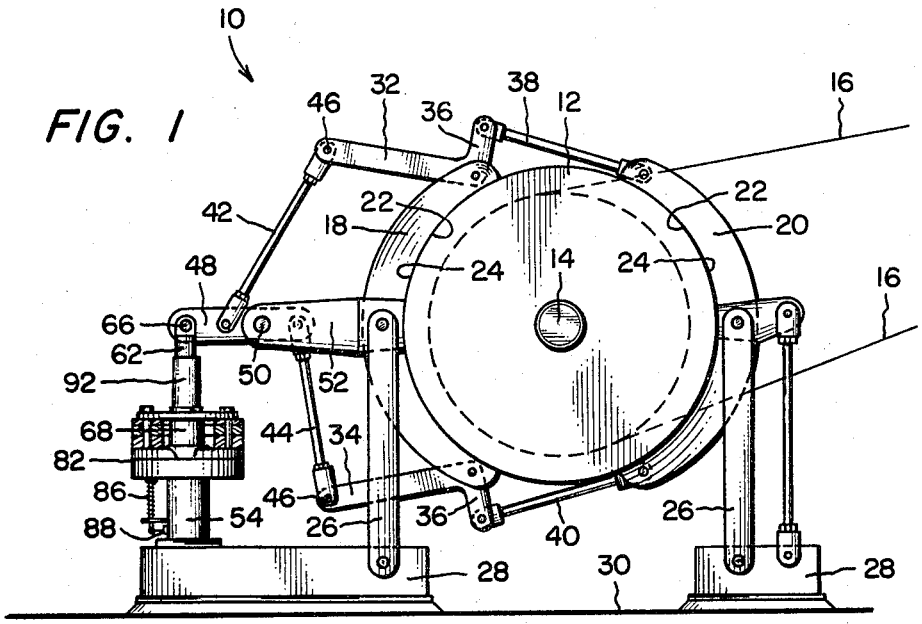
FIG. 1 is a fragmentary, elevational view of a mine hoist which is provided with an embodiment of the brake control mechanism provided by the present invention.

Referring more particularly to the drawings wherein similar reference characters designate corresponding parts throughout the several views, FIG. 1 illustrates a single-drum mine hoist designated generally as 10 which comprises a hoist drum 12 rigidly mounted upon a horizontally extending, rotatably journaled supporting shaft 14. The supporting shaft 14 is connected through suitable conventional gearing (not shown) to a driving motor (not shown) such that it may be rotatably driven by the driving motor. A cable 16 is wound around the hoist drum 12 and carries at its opposing ends the loads (not shown) to be moved by the mine hoist 10.

The brake apparatus on the hoist drum 12 comprises a pair of brake shoes 18, 20 which have braking surfaces 22 adapted for frictional engagement with a braking surface 24 provided circumferentially around the hoist drum 12. The brake shoes 18, 20, as illustrated in FIG. 1, are positioned upon opposing sides of the hoist drum 12 and rock upon links 26 which are supported by bearings 28 seated upon the foundation 30 supporting the mine hoist 10. Braking movement is transmitted between the brake shoes 18, 20 by linkage means such as the bell cranks 32, 34 which, respectively, are pivotally connected to the upper and lower ends of the brake shoe 18 and have arms 36 pivotally connected to the turnbuckles 38, 40 attached to the brake shoe 20. Brake controlling movement is transmitted to the bell cranks 32, 34 by the links 42, 44 which are pivotally connected to the free ends 46 of the bell cranks 32, 34 and also to a rocker arm 48 mounted upon a pivot pin 50 supported by the plate 52. The links 42, 44 are connected to the rocker arm 48 upon opposing sides of the pivot pin 50.

The illustrated embodiment of the brake control mechanism which is provided by the present invention is connected to the rocker arm 48 for actuating the latter to selectively engage the brake shoes 18, 20 with, and release the brake shoes 18, 20 from, the braking surface 24 on the hoist drum 12. More specifically, the illustrated brake control mechanism comprises a vertically extending cylinder 54 which may be mounted upon one of the bearings 28 as illustrated in FIG. 1 or, alternatively, may be mounted upon a base independent of the bearings 28. A first or service piston 56 is disposed within the cylinder 54 adjacent the lower end of the latter for vertical slidable movementt herein. The service piston 56 is mounted by a mounting nut 60 upon the lower end of a vertically extending piston rod 58 which extends sufficiently below the service piston 56 that a chamber 61 is provided below the service piston 56 throughout the vertical movement of the latter. The service piston 56 carries a vertically extending sleeve 64 which projects upwardly from the service piston 56 and surrounds the piston rod 58. The service piston 56, furthermore, is encircled by a circumferential annular sealing member or ring 63.

The upper end of the piston rod 58 is threadedly connected to the lower end of a vertically extending piston rod extension element 62. The upper end of the piston rod extension element 62, in turn, is connected by a pivot pin 66 to one end of the rocker arm 48 such that downward movement of the service piston 56 causes the brake shoes 18, 20 to engage the braking surface 24 and, conversely, upward movement of the service piston 56 causes the brake shoes 18, 20 to be released from the braking surface 24.

A second or weight carrying piston 68, coaxially aligned with the service piston 56 and vertically thereabove, is disposed within the cylinder 54 for vertical slidable movement in the latter. The weight carrying piston 68 includes a vertically extending bore 70 which slidably receives the piston rod 58 to permit vertical movement of the service piston 56 relative to the weight carrying piston 68, the bore 70 being sealed at its upper end by an annular sealing member or ring 72 which extends circumferentially around the piston rod 58. The weight carrying piston 68 is prevented from directly engaging the service piston 56 by the sleeve 64 such that a chamber 74 is formed in the cylinder 54 between the service and weight carrying pistons 56 and 68, respectively. An annular sealing member or ring 76 is disposed circumferentially around the weight carrying piston 68 to prevent fluid leakage from the chamber 74 between the weight carrying piston 68 and the wall of the cylinder 54.

The weight carrying piston 68 carries an annular weight carrier frame 78 which supports a plurality of vertically extending weight supporting rods 80. A plurality of annular weight members 82 are mounted upon the weight supporting rods 80 for downwardly biasing the weight carrying piston 68. A fluid pressure relief switch 88, carried by the cylinder 54, is positioned below the lowermost of the weight members 82. A vertically extending, actuating rod 86, guided by a guide bracket 90 and biased by a coil spring 84 into engagement with the underside of such weight member 82, connects the weight carrying piston 68 with the actuating lever 87 of the relief switch 88 such that downward movement of the weight carrying piston 68 longitudinally displaces the actuating rod 86 to actuate the relief switch 88. The relief switch 88, as will be hereinafter more specifically described, is suitably connected to cause fluid to be exhausted from the chamber 61 upon this longitudinal displacement of the actuating rod 86.

Figure 2:
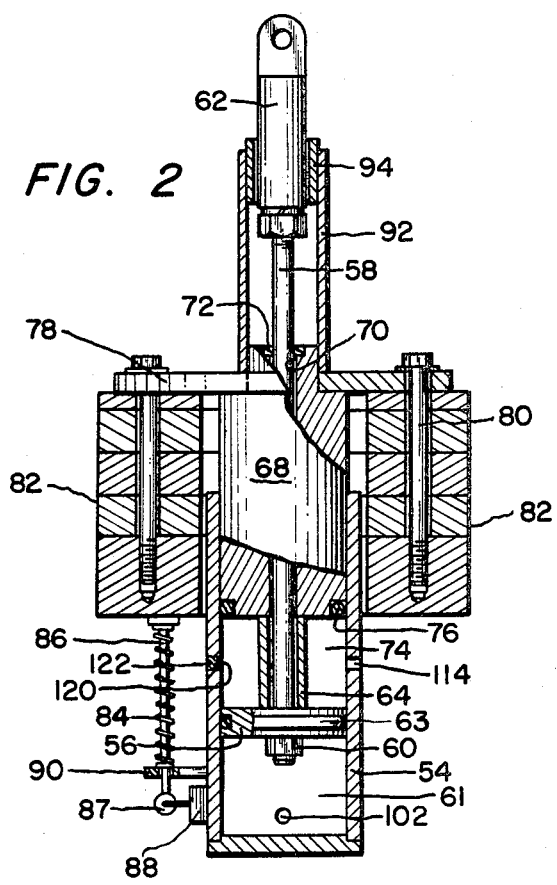
FIG. 2 is an enlarged elevational view, with parts broken away and in section, of the embodiment of the brake control mechanism shown on the mine hoist of FIG. 1.

As illustrated in FIG. 2, the weight carrier frame 78 carries a vertically extending sleeve housing 92 which projects upwardly from the weight carrier frame 78 and extends circumferentially around the upper end of the piston rod 58 and the lower end of the piston rod extension 62. A tubular guide bonnet 94, positioned within the upper end of the sleeve housing 92, internally slidably receives the piston rod extension 62 and, during the vertical movement thereof, guides the latter to prevent the rocker arm 48 from urging it laterally.

Figure 3:
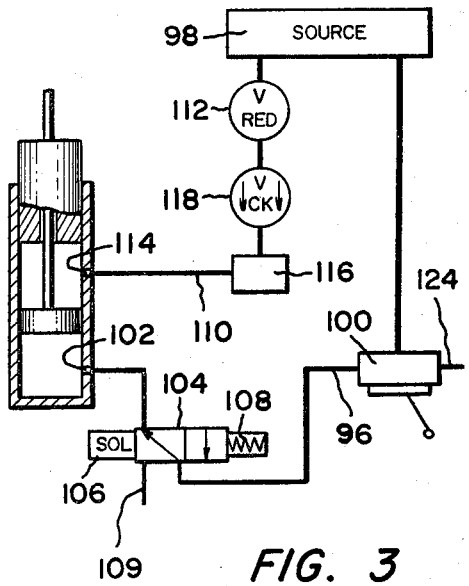
FIG. 3 is a schematic view of the embodiment of the brake control mechanism shown in FIG. 2 in combination with the fluid supply apparatus operating such brake control mechanism.

FIG. 3 schematically illustrates the apparatus employed for supplying pressurized fluid to the chambers 61 and 74 in the cylinder 54. As shown in FIG. 3, a fluid supply conduit 96, connected to a source 98 of pressurized fluid to receive pressurized fluid from the source 98 and containing a manually operable proportional pressure type, control valve 100, communicates through a port 102 in the cylinder 54 with the chamber 61 for supplying pressurized fluid to the latter. A valve 104 is interposed in the fluid supply conduit 96 intermediate the control valve 100 and the cylinder 54. The valve 104 is biased by a spring 108 to a position wherein the fluid supply conduit 96 communicates with an exhaust conduit 109 for exhausting the chamber 61 and is actuatable by a normally energized solenoid 106 to its illustrated position wherein pressurized fluid from the source 98 is supplied to the chamber 61. The solenoid 106 is connected to the fluid pressure relief switch 88 such that downward movement of the weight carrying piston 68 automatically de-energizes the solenoid 106 to permit the spring 108 to shift the valve 104 to its first described position. The solenoid 106 is also connected to a manually operable control switch (not shown) such that it may be selectively de-energized to exhaust the chamber 61. The solenoid 106, furthermore, may be connected to suitable conventional speed-sensing or position-sensing equipment, such as overspeed or overtravel switches, and may even, in fact, be connected to a conventional brake wear switch such that the brake apparatus is applied if the brake linings become excessively worn.

A fluid supply conduit 110, connected to the source 98 of pressurized fluid to receive pressurized fluid therefrom, communicates with the chamber 74 through one of the ports 114, 120 in the cylinder 54. The one of the ports 114, 120 which is not connected to the fluid supply conduit 110 is suitably plugged. Thus, as the port 114 is connected to the fluid supply conduit 110 in the illustrated embodiment of the invention, the port 120 is shown as closed by a plug 122. A pressure reduction valve 112 is interposed within the fluid supply conduit 110 for reducing the pressure of the pressurized fluid received by the latter to a lower constant pressure which is sufficient to vertically support the weight carrying piston 68 without causing upward movement of the latter. A storage container or reservoir 116 is interposed in the fluid supply conduit 110 intermediate the pressure reduction valve 112 and the cylinder 54 for storing the constant pressure fluid supplied by the pressure reduction valve 112. A check valve 118 is interposed in the fluid supply conduit 110 between the reservoir 116 and the pressure reduction valve 112 for preventing the pressurized fluid stored in the reservoir 116 from backflowing in the fluid supply conduit 110.

During the operation of the aforedescribed brake control mechanism, pressurized fluid introduced into the chamber 74 through the fluid supply conduit 110 vertically supports the weight carrying piston 68. The brake shoes 18, 20 are selectively engaged with, and released from, the braking surface 24 on the hoist drum 12 by the lowering and raising, respectively, of the service piston 56 in the cylinder 54. More specifically, to raise the service piston 56 to the position illustrated in FIG. 2 wherein the brake shoes 18, 20 are released from the braking surface 24, the control valve 100 is manually operated to cause sufficient pressurized fluid to be supplied to the chamber 61 through the fluid supply conduit 96. Similarly, to engage the brake shoes 18, 20 with the braking surface 24, the control valve 100 is manually operated such that the chamber 61 is exhausted through the exhaust conduit 124 of the control valve 100. As the chamber 61 is thus exhausted, the service piston 56 is lowered to a position wherein the brake shoes 18, 20 are engaged with the braking surface 24. Similarly, should the pressure of the pressurized fluid in the chamber 61 fall for any reason, the brake shoes 18, 20 will be automatically engaged with the braking surface 24.

In the event that the pressure of the pressurized fluid supplied by the fluid supply conduit 110 to the chamber 74 falls below that needed to vertically support the weight carrying piston 68, whether due to a break in the fluid supply conduit 110 or other causes, the weight carrying piston 68 falls and, through the sleeve 64, urges the service piston 56 downwardly. More specifically, the downward movement of the weight carrying piston 68 actuates the relief switch 88 to shift the valve 104 such that the chamber 61 is exhausted through the exhaust conduit 109. As will be apparent from the aforegoing description, this exhausting of the chamber 61 lowers the service piston 56 to automatically engage the brake shoes 18, 20 with the braking surface 24 to brake the hoist drum 12.

From the aforegoing, it will be seen that I have provided new and improved means for accomplishing all of the objects and advantages of my invention. It will be understood, however, that, although I have illustrated and hereinbefore described only one embodiment of my invention, my invention is not limited merely to this embodiment but contemplates other embodiments and variations which utilize the concepts and teachings of my invention.

Having thus described my invention, I claim:

1. A mechanism for controlling the operation of fluid pressure operated brake apparatus, comprising:
   cylinder means;
   a first piston disposed within said cylinder means for vertical movement therein;
   a second piston disposed within said cylinder means for vertical movement therein and in vertical alignment with the first piston;
   means for connecting said first piston to a brake apparatus such that vertical movement of said first piston controls the operation of such brake apparatus;
   means for supplying to said cylinder means pressurized fluid for causing vertical movement of said first piston;
   means for supplying to said cylinder means pressurized fluid for vertically supporting said second piston;
   means for biasing said second piston against the pressurized fluid supplied to said cylinder means by said latter pressurized fluid supplying means; and
   said first and second pistons being relatively arranged such that vertical movement of said second piston towards the pressurized fluid supplied to said cylinder means by said latter pressurized fluid supplying means causes conjoined vertical movement of said pistons.

2. A mechanism according to claim 1, further comprising:
   said means for supplying pressurized fluid for vertically supporting said second piston being adapted to supply pressurized fluid at a constant pressure to said cylinder means.

3. A mechanism according to claim 2, further comprising:
   said second piston being disposed vertically above said first piston; and
   said means for supplying pressurized fluid for vertically supporting said second piston being adapted to supply pressurized fluid to said cylinder means intermediate said pistons.

4. A mechanism according to claim 3, further comprising:
   said biasing means comprising weight means carried by said second piston.

5. A mechanism according to claim 4, further comprising:
   said pistons being coaxial; and
   said means for supplying pressurized fluid for vertically moving said first piston being adapted to supply pressurized fluid to said cylinder means below said first piston.

6. A mechanism for controlling the operation of a fluid operated brake apparatus, comprising:
   a vertically extending cylinder;
   a first piston slidably disposed within said cylinder;
   a second piston slidably disposed within said cylinder in vertical alignment with said first piston;
   means for connecting said first piston to a brake apparatus such that slidable movement of said first piston within said cylinder controls the operation of such brake apparatus;
   means for supplying to said cylinder pressurized fluid for slidably moving said first piston within said cylinder;
   means for supplying to said cylinder pressurized fluid at a constant pressure for vertically supporting said second piston;
   means for biasing said second piston against the pressurized fluid supplied by said latter pressurized fluid supplying means; and
   said first and second pistons being relatively arranged such that vertical movement of said second piston towards the pressurized fluid supplied to said cylinder by said latter pressurized fluid supplying means provides conjoined vertical movement of said pistons.

7. A mechanism according to claim 6, further comprising:
   said second piston being disposed within said cylinder above said first piston; and
   said means for supplying to said cylinder pressurized fluid for vertically supporting said second piston being adapted to supply pressurized fluid to said cylinder intermediate said pistons.

8. A mechanism according to claim 7, further comprising:
   said biasing means comprising a weight connected to said second piston; and
   said pistons being coaxial.

9. A mechanism according to claim 8, further comprising:
   said means for connecting said first piston to a brake apparatus comprising means for causing vertical movement of said first piston to selectively apply and release such brake apparatus; and
   said means for supplying pressurized fluid for vertically moving said first piston being adapted to supply pressurized fluid to said cylinder below said first piston.

10. A mechanism according to claim 9, further comprising:
    means interposed intermediate said pistons for maintaining said pistons in spaced relationship, said means being adapted to connect said pistons, during movement of said second piston against the pressurized fluid supplied to said cylinder for vertically supporting said second piston, for providing conjoined vertical movement of said pistons.

References Cited
UNITED STATES PATENTS

| | | | |
|---|---|---|---|
| 1,733,898 | 10/1929 | Moore | 188—174 |
| 2,490,941 | 12/1949 | Bell et al. | 188—174 X |

DUANE A. REGER, *Primary Examiner.*